United States Patent
Ansley et al.

(10) Patent No.: US 12,004,266 B2
(45) Date of Patent: Jun. 4, 2024

(54) WIRELESS BACKBONE AND STRUCTURED WIRELESS

(71) Applicant: ARRIS Enterprises LLC, Suwanee, GA (US)

(72) Inventors: Carol J. Ansley, Johns Creek, GA (US); Charles Peter Cheevers, Alpharetta, GA (US); Ian G. Wheelock, Cork (IE); Thomas B. Gravely, Herndon, VA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/987,223

(22) Filed: Nov. 15, 2022

(65) Prior Publication Data

US 2023/0070695 A1 Mar. 9, 2023

Related U.S. Application Data

(63) Continuation of application No. 16/915,257, filed on Jun. 29, 2020, now Pat. No. 11,533,780.

(60) Provisional application No. 62/896,608, filed on Sep. 6, 2019, provisional application No. 62/868,583, filed on Jun. 28, 2019.

(51) Int. Cl.
*H04W 92/02* (2009.01)
*H04W 84/12* (2009.01)
*H04W 88/16* (2009.01)

(52) U.S. Cl.
CPC ............ *H04W 92/02* (2013.01); *H04W 84/12* (2013.01); *H04W 88/16* (2013.01)

(58) Field of Classification Search
CPC .............................. H04W 92/02; H04W 84/12
See application file for complete search history.

(56) References Cited

U.S. PATENT DOCUMENTS

| | | |
|---|---|---|
| 2008/0192692 A1 | 8/2008 | Chari |
| 2013/0335008 A1 | 12/2013 | Luo |
| 2017/0048790 A1 | 2/2017 | Pratapa et al. |

(Continued)

FOREIGN PATENT DOCUMENTS

| | | |
|---|---|---|
| CN | 104769895 | 7/2015 |
| CN | 107040929 | 8/2017 |

(Continued)

OTHER PUBLICATIONS

International Search Report dated Sep. 24, 2020 in International (PCT) Application No. PCT/US2020/040117.

(Continued)

*Primary Examiner* — Jamal Javaid
(74) *Attorney, Agent, or Firm* — Wenderoth, Lind & Ponack, L.L.P.

(57) ABSTRACT

Methods, systems, and computer readable media described herein can be operable to provide a 6 GHz backhaul within a premise. Adapters may facilitate a conversion of communications between one or more local area networks and one or more wide area networks. A 6 GHz backhaul may be used by one or more access points to support various wireless services having unique or differing operational and bandwidth requirements. A 6 GHz backhaul may be used to pass (Continued)

communications between an adapter and a network interface device and/or between the adapter and one or more access points.

20 Claims, 13 Drawing Sheets

(56) References Cited

U.S. PATENT DOCUMENTS

| | | |
|---|---|---|
| 2018/0199218 A1 | 7/2018 | Ashrafi |
| 2018/0324600 A1 | 11/2018 | Aldana et al. |
| 2019/0045534 A1 | 2/2019 | Zaks et al. |
| 2019/0104011 A1 | 4/2019 | Yang et al. |
| 2019/0141620 A1* | 5/2019 | Pujari ................ H04W 48/16 |
| 2020/0145895 A1 | 5/2020 | Dash et al. |
| 2020/0280918 A1* | 9/2020 | Huang ................ H04W 76/11 |

FOREIGN PATENT DOCUMENTS

| | | |
|---|---|---|
| JP | 2015-188170 | 10/2015 |
| JP | 2020-524454 | 8/2020 |
| WO | 2013/122938 | 8/2013 |
| WO | 2014/051630 | 4/2014 |
| WO | 2018/232138 | 12/2018 |
| WO | 2019/005523 | 1/2019 |
| WO | 2019/120566 | 6/2019 |

OTHER PUBLICATIONS

International Preliminary Report on Patentability dated Dec. 28, 2021, in International (PCT) Application No. PCT/US2020/040117.
Office Action dated Aug. 11, 2023 in Canadian Patent Application No. 3,145,527.
Office Action dated Jun. 20, 2023 in Japanese Patent Application No. 2021-577685 (with English translation).
First Office Action and Search Report dated Oct. 11, 2023 in Chinese Application No. 202080057580.1 (with English translation).
Second Office Action issued Mar. 28, 2024 in corresponding Chinese Patent Application No. 202080057580.1, with English translation.

* cited by examiner

WIRELESS BACKBONE AND STRUCTURED WIRELESS

CROSS REFERENCE TO RELATED APPLICATION

This application is a non-provisional application claiming the benefit of U.S. Provisional Application Ser. No. 62/868,583, entitled "6 GHz Wireless," which was filed on Jun. 28, 2019, and is incorporated herein by reference in its entirety. Further, this application is a non-provisional application claiming the benefit of U.S. Provisional Application Ser. No. 62/896,608, entitled "6 GHz Wireless," which was filed on Sep. 6, 2019, and is incorporated herein by reference in its entirety.

TECHNICAL FIELD

This disclosure relates to a wireless backbone and structured wireless.

BACKGROUND

Usage of unlicensed spectrum continues to grow with the growth in wireless devices and services that are available to subscribers. The rise in bandwidth usage, coupled with a lack of new mid-band unlicensed spectrum allocations has created serious congestion issues in available mid-band unlicensed spectrum.

The 6 GHz band is in a prime area of the midband spectrum. Various regulations have been implemented to protect established microwave systems from interference. Regulations also enable microwave systems to be freely deployed and operated.

Regulations have been approved to allow use of the 6 GHz band by unlicensed devices. The regulations include limitations would require that unlicensed devices operate only in locations and frequencies that will not create interference for other users of the 6 GHz band. The FCC has considered varying treatment for four sub-bands of the 6 GHz band, wherein the sub-bands include:
  U-NII 5: 5925-6425 MHz
  U-NII 6: 6425-6525 MHz
  U-NII 7: 6525-6825 MHz
  U-NII 8: 6875-7125 MHz Different regulations have been proposed for each of the sub-bands. Example use limitations that may be imposed for the sub-bands include:
  For the U-NII 5 and U-NII 7 sub-bands:
    i. Unlicensed devices may only be allowed to transmit under the control of an automated frequency coordination (AFC) system.
    ii. The AFC system may identify frequencies on which unlicensed devices may operate without causing harmful interference to fixed point-to-point microwave receivers.
    iii. Unlicensed devices may operate at a standard power (e.g., 4 W, 1 W, etc.).
  For all of the 6 GHz sub-bands:
    i. Unlicensed devices may be restricted to indoor use and may be required to operate at lower power (e.g., 1 W, 250 milliwatts, 24 milliwatts, etc.), without requiring the coordination of an AFC system.
    ii. The frequencies in the U-NII 6 and U-NII 8 sub bands are used for mobile services, such as the Broadcast Auxiliary Service and Cable Television Relay Service, as well as fixed satellite services. The itinerant nature of the mobile services makes the use of an AFC system impractical.
    iii. The combination of lower power and indoor operations may protect other registered services already operating on these frequencies from harmful interference.

BRIEF DESCRIPTION OF THE DRAWINGS

Like reference numbers and designations in the various drawings indicate like elements.

DETAILED DESCRIPTION

Methods, systems, and computer readable media described herein can be operable to provide a 6 GHz backhaul within a premise. Adapters may facilitate a conversion of communications between one or more local area networks and one or more wide area networks. A 6 GHz backhaul may be used by one or more access points to support various wireless services having unique or differing operational and bandwidth requirements. A 6 GHz backhaul may be used to pass communications between an adapter and a network interface device and/or between the adapter and one or more access points.

Automated Frequency Coordination (AFC)

Figure 1:
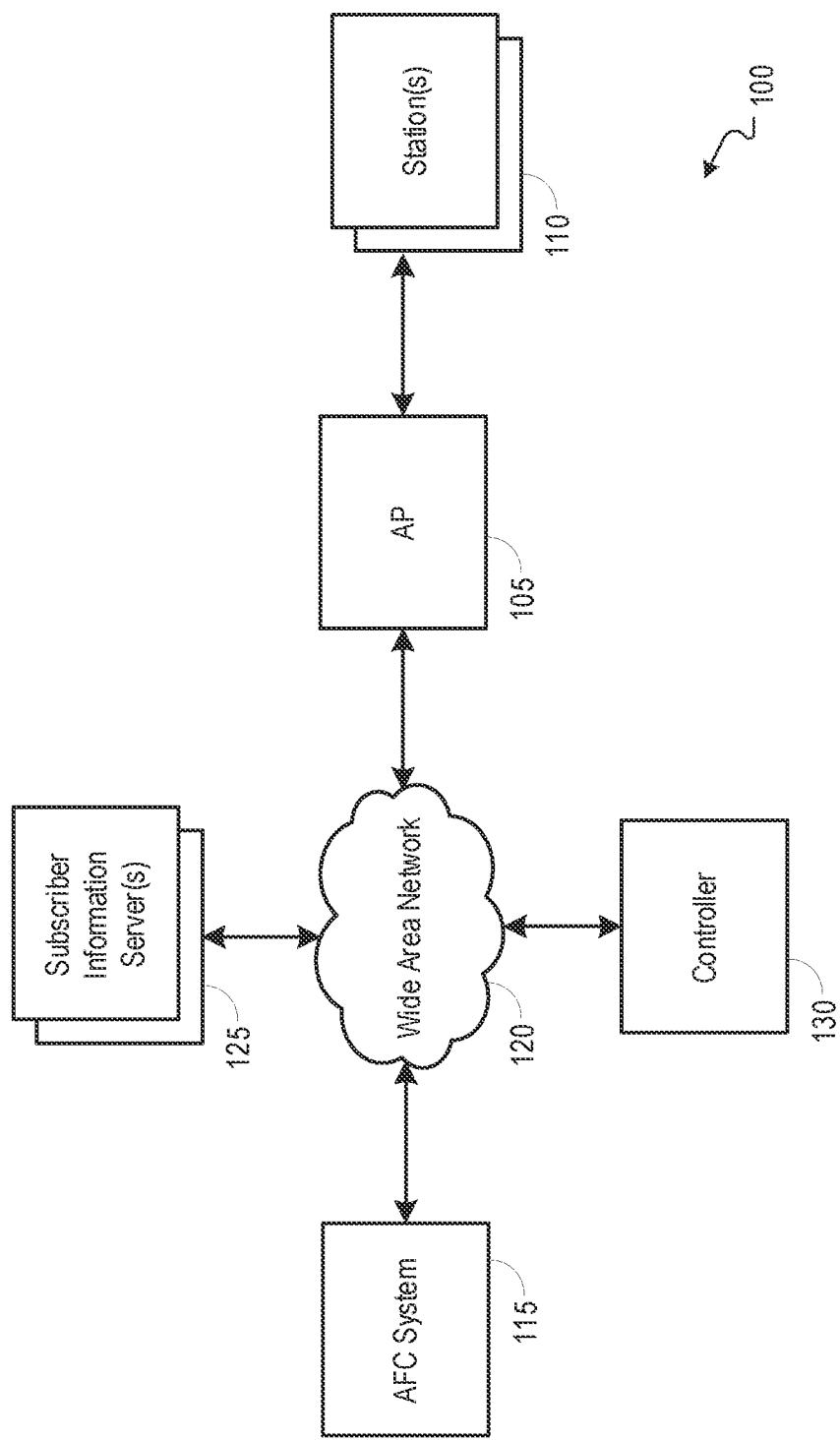
FIG. 1 shows an example network operable to facilitate device management based upon a determination of proximity to one or more exclusion zones.

FIG. 1 shows an example network 100 operable to facilitate device management based upon a determination of proximity to one or more exclusion zones.

In embodiments, operation of a device (e.g., an access device such as an access point (AP) 105 and/or one or more stations 110 associated with the AP 105) may be dependent upon communications with an AFC system 115. An AP 105 as described herein may include a RLAN (radio local area network) device, a WLAN (wireless local area network), and any other device configured to facilitate wireless communications with other devices. The AFC system 115 may include a database that contains pre-calculated exclusion zone data for one or more microwave paths. It should be understood that spectrum availability may be calculated upon request. The exclusion zone data may be updated at the database periodically (e.g., hourly, daily, etc.) or in response to an addition or deletion of data associated with a microwave path. Communications between a device and the AFC system 115 may be over wired or wireless links not in the 6 GHz band. The AFC system 115 and its database may be connected to a packet-based wide area network (e.g., wide area network (WAN) 120), including but not limited to the Internet. Each of one or more devices (e.g., AP 105) may register with the database. Initial registration and query may be made outside of the 6 GHz bands. In embodiments, each device (e.g., APs 105) may also register devices that are associated with the device (e.g., STAs (stations) 110, clients, etc.). Each device may query the database with location information (e.g., location information associated with a current location of the device), an identification of the device type, identifying information (e.g., unique identifiers), and/or other information associated with the device. Based upon the query received from each respective one device, the database may determine a proximity of the respective device to one or more exclusion zones.

A device (e.g., AP 105) may automatically determine a geographic location at which the device is currently positioned and/or a location at which the device has been installed. For example, GPS, cellular triangulation, or other systems may be utilized to determine a location of the device. A device may alternatively or additionally be proved using location information through a local user interface or remotely through a provisioning or status interface.

In embodiments, the device may include an internal GPS through which the device may determine its current location. The internal GPS may be utilized by a device that is installed at an outdoor location.

In embodiments, the device may communicate with a detached GPS receiver to determine a current location of the device. For example, the GPS receiver may be installed at an outdoor location while the device may be installed at an indoor location. With the location of the GPS receiver being known, the device may determine its own location using one or more Wi-Fi location determination features to map back from the GPS receiver's location. For example, the device may measure a signal strength and/or direction component associated with one or more wireless signals received at the device, and the measurements may be used to identify a location of the device relative to the GPS receiver.

A STA (station) 110 (e.g., wireless extender, etc.) may determine its location by wirelessly communicating with the device (e.g., AP 105). The STA 110 may determine its location relative to the device. For example, the wireless extender may use one or more Wi-Fi location determination features (e.g., signal strength, direction component associated with one or more received signals, etc.) to map its location relative to the device.

It should be understood that cellular triangulation may be used in place of GPS. Other satellite-based location determination services may also be used in the place of GPS, such as Galileo.

The device (e.g., AP 105) may be manually configured with device location information. In embodiments, a technician (e.g., licensed technician or installer) may configure the device with location information once the device has been installed. For example, the device may be configured with a trusted certificate, blockchain, or other information to be used to authenticate a location of the device that is manually provided.

The device (e.g., AP 105) may be provided location information through a provisioning server or configuration server. In embodiments, a provisioning server may have information about the address of a customer deploying the device and may provide that address information to the device.

In embodiments, the device (e.g., AP 105), or an upstream device (e.g., controller of the AFC system 115), may be configured to detect a movement of the device. The device, or upstream device, may be configured to determine a current location of the device in response to a triggering event. Triggering events may include, but are not limited to, the following: reboot of the device, detection of a loss or addition of a STA from which communications are received by the device, and others. In embodiments, a co-located device (e.g., AP (access point)) may determine that another co-located device has moved based upon a change in location that is indicated by one or more Wi-Fi location determination features.

An outdoor GPS-AP may utilize an interlock to prevent it from being moved and continuing to operate. Such an interlock could cause the AP to reinitialize its GPS position and contact the AFC when it believes it has been moved. If the device had used a technician provided location, a physical interlock may be utilized. For example, if the AP lost power and had power restored, it could attempt to determine if it had been moved by querying other location-specific or at least location-indicating attributes. For example, if it was integrated with a cable modem, the cable modem could inform the AP whether or not it had been moved to a new HFC (hybrid fiber-coaxial) feed (new power levels, new CMTS (cable modem termination system) communication information, different cable group, etc.). Other location indications could be: DHCP server changes, DHCP Gateway changes, new clients/loss of old clients, new overlapping Wi-Fi Basic Service Sets (OBSSs). In embodiments, a 6 GHz AP may be collocated with a 5 GHz AP and/or a 2.4 GHz AP. If those collocated APs report new neighboring APs, one or more new clients, or the presence of other new wireless devices, the 6 GHz AP may refuse to transmit until its location is updated by a trusted source.

In embodiments, the AFC system 115 may utilize location information from multiple sources to verify or otherwise improve the level of confidence in a determined location of a device (e.g., AP 105). For example, the AFC system 115 may correlate location information of a device with GPS data with a physical address associated with a customer (e.g., an address recovered from billing data or subscriber information held at a subscriber information server 125 such as a service provider server or other server storing subscriber or account information).

Location Determination Through RF Scans in 6 GHz Band

A device needing to perform location determination, typically an AP 105, initializes and comes up to scan available frequency bands. An AP may have access to 2.4 GHz, 5 GHz, and 6 GHz radios. The AP can scan 2.4, 5 and 6 GHz bands for Wi-Fi signals. The SSIDs obtainable from received Wi-Fi transmissions can contribute to an estimate of the AP's location. The signals of other 6 GHz APs may be detected from a 6 GHz scan or from analysis of information about 6 GHz SSIDs included in the 5 GHz or 2.4

GHz signals. For example, one or more signals received by an AP 105 through a 2.4 GHz or 5 GHz radio may indicate a presence or offering of a 6 GHz SSID by one or more other APs. A goal of 802.11 standards for the 6 GHz band is to restrict the amount of beaconing and similar activities to decrease the percentage of airtime given over to background or maintenance activities. An AP with 6 GHz capability may announce that capability in its 2.4 and/or 5 GHz transmissions.

The AP 105 can also scan 6 GHz bands for the presence of non-Wi-Fi signals. The signals of fixed wireless or other non-Wi-Fi communications can be detected and, potentially, their directions recorded. Utilizing energy detection, an AP need not be able to demodulate or decode a fixed wireless or other non-Wi-Fi communications signal to detect its presence. In embodiments, further processing, beyond energy detection, is performed on the received signal spectrum. The characteristics of at least well-known signals such as fixed microwave signals can be applied to the received signal spectrum and energy signatures of potential interest marked for more processing. For instance, fixed microwave signals are typically 30 MHz wide and occur in pairs. These signals are also required to be registered with the FCC. In embodiments, a signal spectrum detected by an AP may be processed locally or sent to a controller 130 or cloud server for further processing.

If the AP 105 is processing the spectrum locally, it may detect a certain combination of fixed microwave signals. With that information, the AP can consult a database containing 6 GHz registered signal sites. Fixed wireless assigned frequencies may be recorded in a database that also includes location information. When combined with the Wi-Fi signal information, the location of the AP may be ascertained with greater certainty or less uncertainty. An AP may develop a location estimate based on these sources of information, even if a GPS or similar location determination equipment is not available. If the AP sends a collected signal spectrum to a controller 130 or cloud server, those entities similarly may consult databases of known 6 GHz entities to develop a location estimate. Those entities may also consult databases of known 2.4 GHz and 5 GHz signal sources. That estimate may be returned to the AP for it to use in communication with an AFC system. Alternatively, the controller 130 or cloud server may forward the location estimate with information identifying the AP to an AFC. If the AP recognizes Wi-Fi signals within the 6 GHz scan, that information may also be used to aid with location determination.

As mentioned earlier, additional sources of location information may include client devices such as smart phones that have associated with the AP's 2.4 or 5 GHz radios as well as GPS receivers or the like. Many smart phones have built-in GPS receivers and can provide an estimate of their current location by combining their GPS signals (if any) with other signals in the Wi-Fi bands and other indications as known in the art. The client devices may have an app installed that facilitates communication with the AP and indicates to the AP whether or not the client device will share its current location estimate. In embodiments, a user of a client device may be presented with an option to share its location with its associated AP or not. The AP may request a location estimate from the client device by communicating with the app. Alternatively, the controller may communicate with the client device's app on the AP's behalf to acquire the client's location estimate.

The AP may use an algorithm itself to predict its most likely location based on the various inputs it received, or it may contact another device or server, provide the information and receive an estimated location with an estimated location error. An AP or a location server may use standard techniques of localization and triangulation to predict the AP's location from the gathered data.

The AFC database (at the AFC system 115) may utilize a buffer to compensate for potential inaccuracies with respect to the location information carried by a query. The AFC database may identify one or more frequencies available to the respective device (e.g., AP 105), wherein the available frequencies are based upon the determination of whether the respective device is located within an exclusion zone. Further, the database may identify one or more operating requirements, such as transmit power level, based upon the determination of whether the respective device is located within an exclusion zone. The database may send a list of the available frequencies to the respective device, and the respective device may begin operating according to any operating requirements at an available frequency identified from the list.

In embodiments, a device registered with the AFC database may send heartbeat messages to the database in order to ensure that exclusion zone data is current and to confirm that the device is active. A device may deregister from the AFC database when a determination is made that the device has been moved by more than a threshold distance (e.g., 50 m, 100 m, etc.), when a heartbeat message is not received for longer than a certain duration (e.g., 24 hours, etc.), or in response to another triggering event.

If an AP is providing high reliability services, the AP may register with more than one AFC and retain records for the at least two different AFC responses providing channel availability and power levels. The AP may choose to use one AFC's response over another AFC's response if the responses differ, or it may choose to comply with the union of the two responses.

A monitoring site already in position for CBRS may be enhanced to also collect signatures of radio traffic in various bands outside the CBRS band. It had been true that radios were fairly dedicated to specific frequency ranges, but as software defined radios (SDR) with flexible front ends have improved in performance and cost-effectiveness, that limitation is less accurate. If an SDR is being used for reception only, some of the concerns that attach to SDR are mitigated. One common concern is that the filtering for out-of-band emissions for SDR transmitters is difficult or expensive. If the SDR is only operating as a receiver, that concern is minimized.

6 GHz devices may also include 2.4 GHz and/or 5 GHz radios. This allows an AP, for example, to provide only minimal beaconing in its 6 GHz allotted channel because its 5 GHz beacon can include information about any 6 GHz interfaces. For example, the AP may advertise a 6 GHz SSID through a beacon provided by a 2.4 or 5 GHz radio of the AP.

If a 6 GHz device, such as an AP or mesh station, does not include an LTE radio, one or more of its clients or associated devices may, such as a cell phone. In that case, an AP, for example, might ask its clients for information about networks seen over the air, even if it does not request an actual location determination from those devices.

The AFC database may alternatively receive information such as 5 and 6 GHz signals received by the device seeking to register. The information about 5 and 6 GHz signals received may include SSIDs from Wi-Fi APs, as well as frequencies where energy was detected above a threshold in the 5 and 6 GHz bands. The information about 5 and 6 GHz signals received may include signal strengths associated with the received signals as well as angular directions.

The database may correlate received energy signatures with known 6 GHz fixed microwave deployments to determine a device's probable location. Known 6 GHz microwave deployments may be registered with their frequency usage and locations. Detection of a certain pattern of 6 GHz signals can be matched against known deployments to allow the AFC database to estimate where a device would have to be to receive that pattern of 6 GHz signals. For example, fixed microwave links in the 6 GHz band are known to be 30 MHz wide and to exist in pairs. The database would consider not only the detected 6 GHz signal in making a frequency assignment for a requesting device that reports receiving at least one 30 MHz signal in its 6 GHz scan. Detection of one 30 MHz wide signal necessarily implies that the matching paired signal may also potentially be affected if the device begins transmissions in the frequencies assigned to the paired signal.

Similarly, the database may correlate the received SSIDs with known SSID locations to determine a device's probable location. The database may combine the various estimations to form an estimate with greater confidence. If the estimates formed based on different information sources do not indicate the same location within a certain amount of uncertainty, then the database may choose which estimates to rely upon to make a registration decision, or it may reject the registration request entirely. The relative signal strengths and directions may be combined with the location estimation to determine if the information provided is credible.

The database may also use the relative signal strengths and directions to determine the transmit power level allowed for a device as well as an allowed frequency block. For example, a device that reports very low signal levels for 5 and 6 GHz received signals may be within a building so that those other signals reach it only faintly. In this case, the database could allow that device to use a higher transmit power safely because its transmissions will also be attenuated heavily before they reach any 6 GHz fixed microwave operations.

Location Awareness

The device, or a related upstream device, may be configured to determine that the device has moved by comparing a current location of the device to a baseline location of the device (e.g., the location information automatically determined or manually entered during an install or initial setup of the device). Additional description for comparing a current location of a device to a baseline location of the device to determine that the device has been moved may be found within U.S. application Ser. No. 15/131,693, entitled "Detecting Device Movement through Electronic Fingerprint Analysis," filed on Apr. 18, 2016. The disclosure provided by U.S. application Ser. No. 15/131,693 is incorporated herein. The device may respond to a determination that a current location of the device differs from the baseline location of the device by initiating an action for ensuring compliance with regulatory requirements. The device may be configured to initiate an action for ensuring compliance with regulatory requirements only when the difference between the current location of the device and the baseline location of the device exceeds a certain threshold. Actions for ensuring compliance with regulatory requirements may include, but are not limited to, the following: halting AFC-regulated operation; reducing transmit power; changing channel to a channel that does not require AFC-regulated operation; powering down the device; and others.

In embodiments, access may be gained to a database of AP SSIDs linked with locations. Such a database may be offered as a service where a device can survey the APs that it can hear and ask the database where the device is most likely physically located based upon a report of what it can hear.

An AFC may offer similar services using a wider network of networks. An AFC may use data from its own sensors to gather information about locations. An AFC's own sensors' locations may be well known, allowing information from sensors with well-known locations and well-known antenna patterns to be trustworthy. An AFC may accept information from devices already having trustworthy accepted locations about 6 GHz signals, Wi-Fi APs (SSIDs and RSSI) and/or LTE or 5G base stations or microcells. Also available in some areas and from certain devices or sensors could be 900 MHz signals for Wi-Fi HaLow, Lora, SigFox or other such signals. The AFC may use that information, when the device is trusted, to enhance its mapping ability. It may also doublecheck location information from new devices seeking authorization by requesting information from that untrusted device about other signals it has detected. If the other information matches to within a certain degree of error the location information provided by the new device, then the AFC would have additional confidence that its reported location is correct. On the other hand, if the location information from the device does not agree with the wireless environmental information provided by that device, then the AFC may not choose to trust that device or provide it with a high power channel authorization.

Alternatively, a device might use an available service to determine its location in lieu of having the ability to determine its location through access to a GPS or through the use of cellular location services. When the device reports its location to an AFC, it may provide a margin of error for that determination based on a factor returned by the location service.

Database Management

A controller or database may be utilized to store exclusion zone data associated with areas in which unlicensed band usage may impact microwave paths. The controller or database may include or may be a part of the AFC system. Updates to exclusion zone data may be pushed to the controller or database or may be pulled by the controller or database from one or more sources of exclusion zone data. Exclusion zone data may include one or more geographic locators (e.g., GPS coordinates, etc.) making up boundaries of exclusion zones or that are otherwise positioned within boundaries of exclusion zones. Exclusion zones may be areas that have been designated as areas in which unlicensed band usage may impact microwave paths.

In embodiments, periodically or in response to certain triggers, the controller or database may identify one or more devices that are operating at a location that falls within a region that is the subject of an update which has been made to the exclusion zone data. For example, when an update to exclusion zone data is received, the controller or database may check location information associated with one or more devices to determine whether the location information of any of the one or more devices indicates that the device is located within an area that is affected by the update. As another example, the controller or database may periodically (e.g., hourly, daily, weekly, etc.) determine whether the location information of any of the one or more devices indicates that the device is located in an area that is affected by an update made to the exclusion zone data during the certain duration covered by the period. In response to a determination that a device is located within an area that is affected by an update to the exclusion zone data, the controller or database may output updated frequency information (e.g., AFC operational requirements) to the device.

In embodiments, the controller or database may include channel scanning functionality or secure and authenticated access to external channel scanning functionality.

In embodiments, the controller or database may maintain a schedule of band usage by one or more microwave systems. The controller or database may clear or terminate channel usage at one or more devices based upon the schedule.

In embodiments, the controller or database may generate a schedule of band usage by one or more microwave systems. The controller or database may monitor channel usage by the one or more microwave systems and may record times/days during which the microwave systems are active. Based upon the monitored channel usage, the controller or database may generate a schedule of daily/weekly/yearly use. The controller or database may clear or terminate channel usage at one or more devices based upon the schedule.

In embodiments, the controller or database may direct one or more devices (e.g., one or more devices within an MDU (multiple dwelling unit), campus, etc.) to use certain frequencies based upon frequencies used by other devices. The controller may also direct other devices to alter their power levels or to use directed null forming to avoid causing interference. For example, the controller or database may allocate 6 GHz channels among a group of APs that are within a certain proximity of each other, wherein the allocations are made on a non-interference basis.

In embodiments, a device (e.g., an AP) may receive communications indicating that a microwave path with which the device has been associated based upon a current location of the device has become active or inactive. For example, a beacon positioned in close proximity to a microwave system may determine a current state of the microwave system. When the state of the microwave system changes (e.g., when the corresponding microwave path becomes active/inactive), the beacon may output notifications indicating the state change to one or more devices that are located within an exclusion zone associated with the microwave path. For example, the notifications may include clearances or termination requests that notify the one or more devices that one or more frequencies have become available or unavailable. Further, the notifications may notify the one or more devices that operational requirements either may be temporarily ignored or should be adhered to based upon the identified state change.

In embodiments, an AP may scan a channel to determine whether a 6 GHz band is available. For example, an AP operating at low power may carry out a scanning of the 6 GHz band as a background operation. If signals are detected on the 6 GHz band, the AP may refrain from using the 6 GHz band or may alternatively remain at low power until the 6 GHz band is clear.

Operational Deployment

In embodiments, an AP may have both a 6 GHz radio and another radio (e.g., 2.4 or 5 GHz radio). If a 6 GHz AP has a legacy band (2.4 or 5 GHz) and a 6 GHz STA also has legacy capabilities, then the AP may advertise in the legacy band its 6 GHz capabilities. In embodiments, a device may be configured with a 2+5+6 solution. In embodiments, a device may be configured with a 2+5+5/6, wherein one of the radio chains is switchable between 5 GHz and 6 GHz.

If the units are a bookend solution and/or controlled by a home networking controller, a home networking controller may direct a STA/extender to a specific 5 or 6 GHz channel depending upon the STA's 5 GHz RSSI. The controller may consider the performance of similar stations already attached at 6 GHz to determine whether or not the STA should be directed to the higher band. If the higher channel has a very wide channel with little or no interference, then the controller may choose to move the STA.

Figure 2:
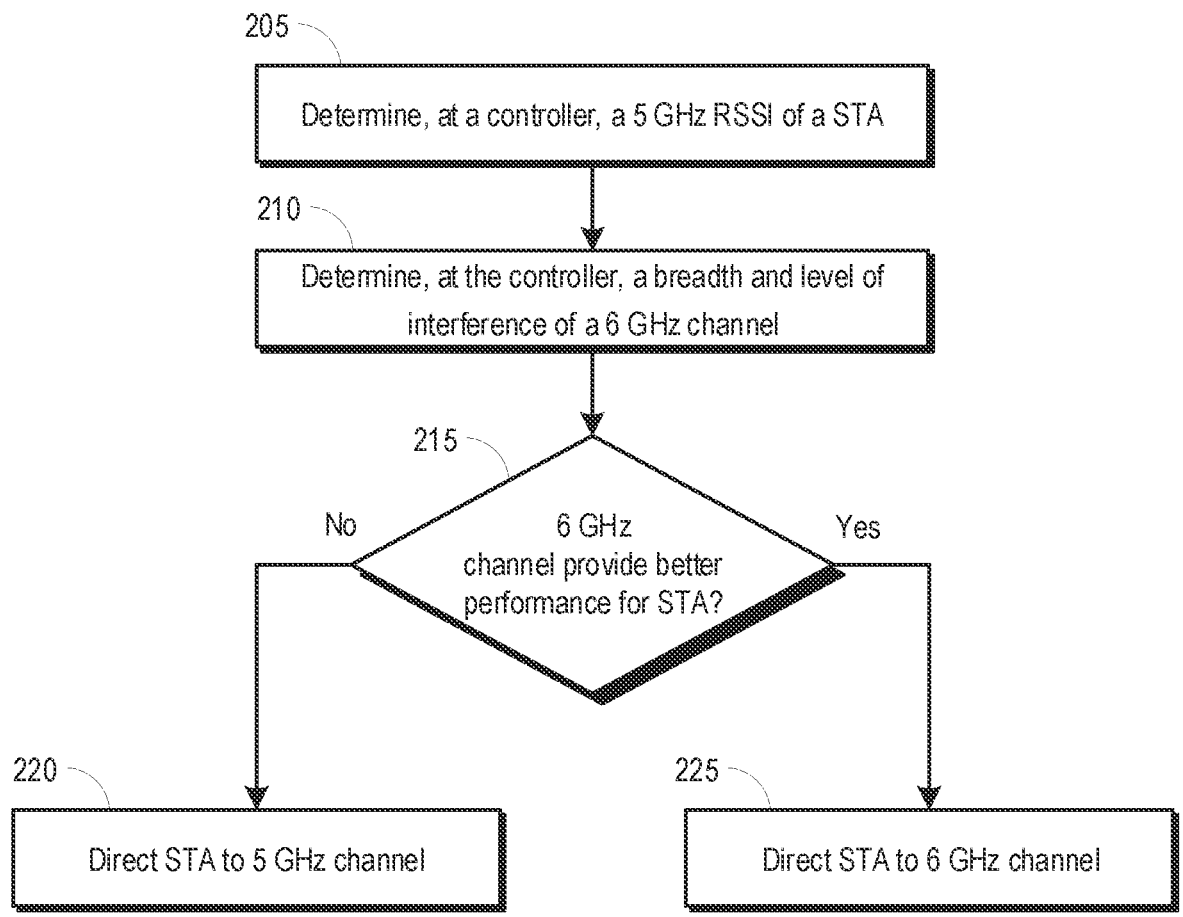
FIG. 2 is a flowchart showing an example process for directing a STA to specific channel based upon potential operating performance at a 6 GHz channel.

FIG. 2 is a flowchart showing an example process 200 for directing a STA to specific channel based upon potential operating performance at a 6 GHz channel. For the controller to make good decisions, it needs access to the AP's AFC channel/power assignments. The APs might handle the request process independently and keep the controller up to date on any assignments or refusals. As the controller decides which band to assign a station to, the controller may consider the STA's current RSSI as well as RSSI history, as well as the channel assignments and power level limits of the APs it controls. At 205, the controller may determine a 5 GHz RSSI of a STA. At 210, the controller may determine a breadth and level of interference of a 6 GHz channel. At 215, the controller may determine whether the 6 GHz channel may offer better performance for the STA than the currently used 5 GHz channel. If the determination is made that the 6 GHz channel does not offer better performance for the STA, the controller may direct the STA to the 5 GHz channel at 220. If the determination is made that the 6 GHz channel does offer better performance for the STA, the controller may direct the STA to the 6 GHz channel at 225.

Figure 3:
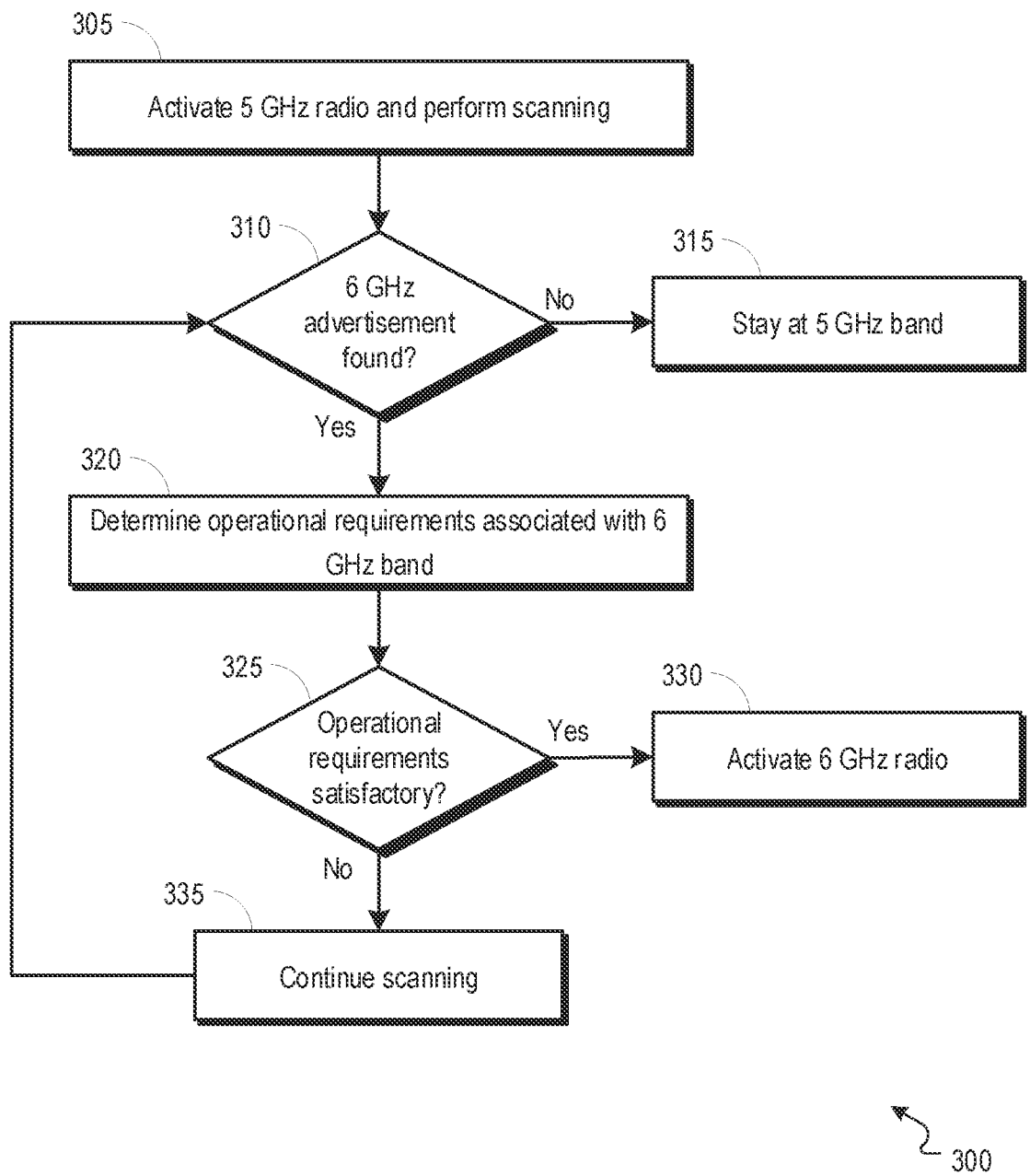
FIG. 3 is a flowchart showing an example process for scanning for a satisfactory 6 GHz channel.

FIG. 3 is a flowchart showing an example process 300 for scanning for a satisfactory 6 GHz channel. If the units are un-related, a STA may turn on and activate its 5 GHz radio and perform normal scanning at 305. If a 6 GHz advertisement is not found at 310, the STA may stay at the 5 GHz band at 315. If an AP is found that also advertises a 6 GHz capability at 310, the STA can consider which 6 GHz channel/band is included in the AP's information. For example, the STA may determine operational requirements associated with the 6 GHz band at 320. Since the US current regulatory proposals indicate that the power level may be set by channel, the STA may take that into consideration. If the determination is made at 325 that the operational requirements of the 6 GHz band are satisfactory to the STA, the STA may activate a 6 GHz radio at 330. If, at 325, the STA determines that the operational requirements of the 6 GHz band are not satisfactory, the STA may continue scanning at 335. For example, if the channel is a low power channel, the STA may preferentially keep looking until it finds an AFC/high power channel.

In embodiments, multiple APs may coordinate to maximize efficiency of band usage between the multiple APs. For example, the APs may coordinate use of the large bands based upon the varying regulatory requirements associated with each of the bands.

With the potentially lower power limits (at least for a while), spreading STAs across multiple APs may be helpful to use the wide bandwidth to bring up the data rate. A deployment constrained to a low power level, such as 250 mW, may require more APs to cover the same area compared to a standard 5 GHz AP (1W).

A collection of APs that are centrally coordinated can send in separate AFC requests and a central coordinator might choose how to distribute the STAs based on the responses. In embodiments, a controller may direct an AP to resend its request if the results are not acceptable.

STAs may be directed to go from standard power to low power or to evacuate the band if an AFC withdraws the previously allowed channel(s) from an active AP.

In embodiments, an AFC may withdraw a channel allocation at any time. If an AP receives a withdrawal notice from the AFC, the AP may notify all STAs that they must at least drop to low power. If the operational parameters do not allow the STAs to change their power level and remain on the channel, then the AP may direct the STAs to shift to a non-6 GHz band until the AP can obtain a new assignment from the AFC.

Timing Distribution/Low Latency Services/QoS

PTP (IEEE-1588) allows distribution of timing over Ethernet. DTP (DOCSIS Timing Protocol) from CableLabs extended this technology over DOCSIS.

Motivation for 6 GHz Wi-Fi application: new unlicensed frequency band likely to have little interference for a while, especially if all four bands are opened. If only band 6 is open, that advantage will be short-lived.

This disclosure applies to a cable modem GW that also has Wi-Fi including 6 GHz (but not required). The CM supports DTP as does its supporting CMTS. The CMTS/CM could provide several different timing sources. As different mobile providers advance their networks from 4 G to 5 G at different rates, there may be different timing feeds available for different small cell/pico cell uses. The timing feeds may also be of different qualities (4 G vs 5 G 1 ms).

The AP can advertise its support for timing distribution or provide it later in a capabilities exchange. This notification could come via a field in the beacon or in a capabilities exchange after the STAs are associated. The notification could include multiple possible timing sources that the CM/AP may have available. The notification could also indicate the accuracy or quality of each potential timing source. A STA decides whether an AP can provide a timing feed that it needs. The STA can request the timing feed. If a STA wants to receive a timing distribution, it notifies the AP that that it wants to receive a timing distribution. That notification could indicate which timing source the STA is interested in and/or potentially a level of accuracy or quality that it needs to receive. The AP may evaluate whether it can provide the service that the STA has requested. The AP may need to communicate with the CM and/or the CMTS to ensure that the requested service and QoS level can be provided. The AP/CM passes that request back to the CMTS. If the CM/AP has to support multiple timing feeds then the CM may select which one to use for its internal systems, or it may not use any specific feed directly. If the AP can provide the STA with the service it requested, then it selects an OFDM/OFDMA downstream and upstream channel to carry the timing messages. For example, the timing messages may be carried over a selected 6 GHz channel. Note that the channel may actually be one or more resource units (RU) as known in 11ax with limited bandwidth, but that can be dedicated to this purpose. The AP and STA begin communicating over that RU according to a schedule developed by the AP to accommodate the QoS requirements of the service level that the STA had requested. The AP may choose a limited set of MCS settings for the channel to ensure predictability and good performance.

Figure 4:
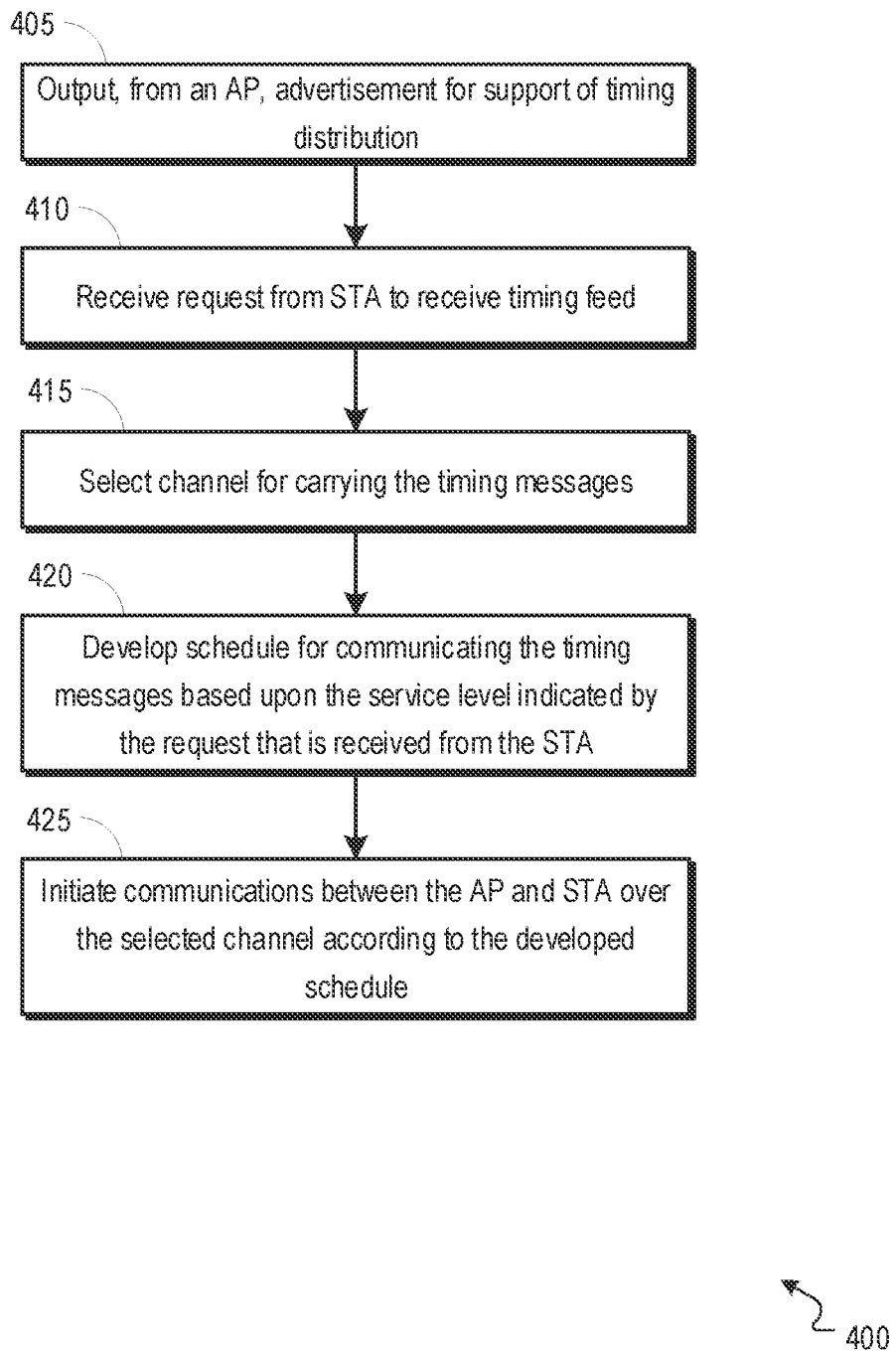
FIG. 4 is a flowchart showing an example process for establishing a timing distribution between an AP and STA.

FIG. 4 is a flowchart showing an example process 400 for establishing a timing distribution between an AP and STA. At 405, the AP may output an advertisement for support of timing distribution. At 44, the AP may receive a request from a STA to receive a timing feed, wherein the request is output from the STA in response to the STA recognizing the advertisement. At 415, a channel may be selected for carrying the timing messages. For example, the timing messages may be carried over a selected 6 GHz channel. At 420, a schedule for communicating the timing messages may be developed based upon a service level indicated by the request that is received from the STA. At 425, communications may be initiated between the AP and the STA over the selected channel according to the developed schedule.

Figure 5:
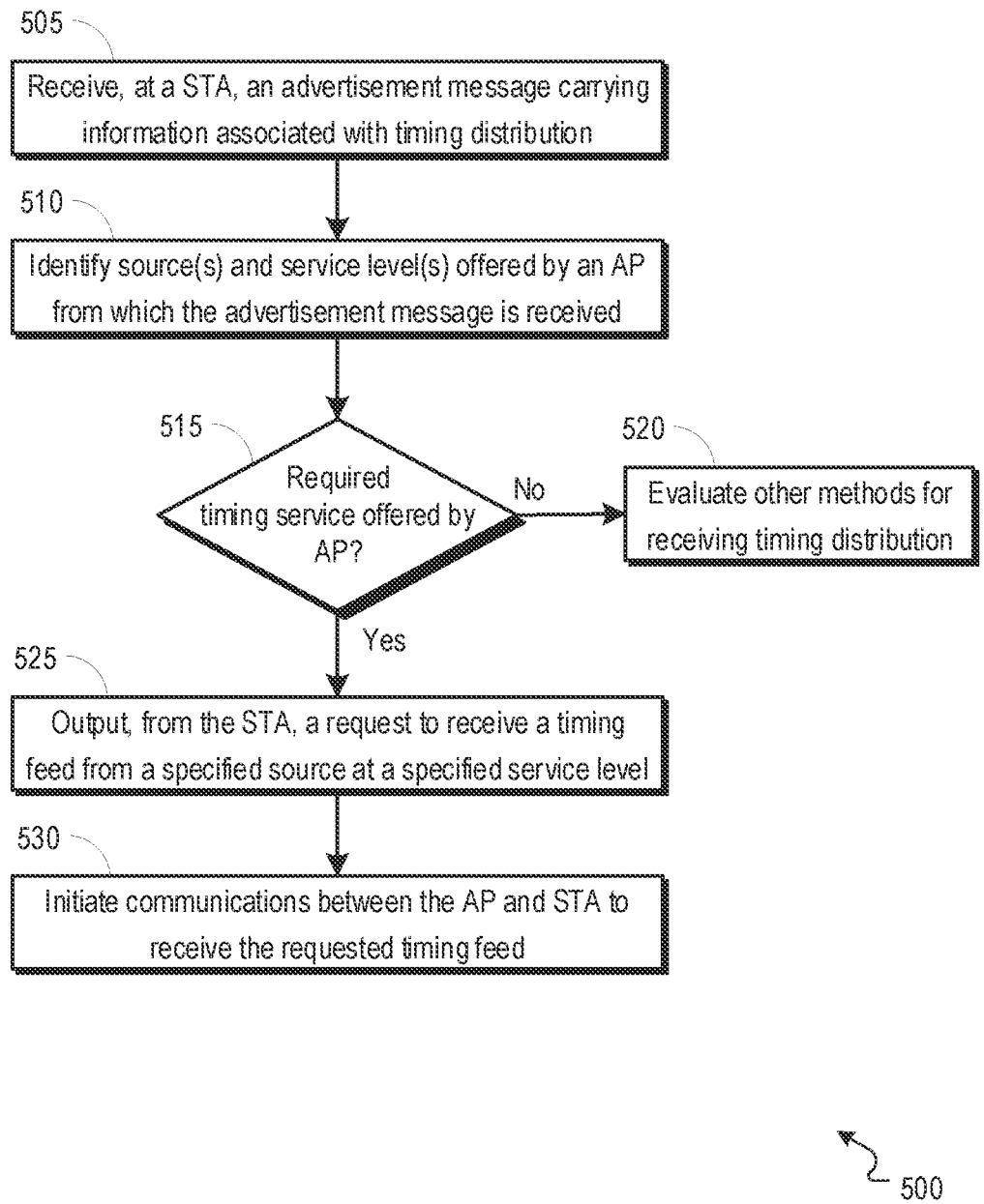
FIG. 5 is a flowchart showing an example process for establishing a timing distribution between an AP and STA, wherein the STA determines whether the AP offers the timing distribution from a certain source at a certain service level.

FIG. 5 is a flowchart showing an example process 500 for establishing a timing distribution between an AP and STA, wherein the STA determines whether the AP offers the timing distribution from a certain source at a certain service level. At 505, a STA may receive, from an AP, an advertisement message carrying information associated with timing distribution that is offered by the AP. At 510, the STA may identify sources and/or service levels offered by the AP. At 515, the STA may determine whether a required timing service is offered by the AP. If the required timing service is not offered by the AP, the STA may evaluate other methods for receiving a timing distribution at 520. If the required timing service is offered by the AP, the STA may output a request to receive a timing feed from a specified source at a specified service level at 525. At 530, communications may be initiated between the AP and STA to receive the requested timing feed.

6 GHz Backbone

In embodiments, the 6 GHz band may be utilized by a collection of access points or extenders as a backbone to support a wireless network that is provided to one or more STAs or clients. One or more channel blocks within one or more sub-bands of the 6 GHz band may be allocated to each of collection of APs or extenders of a wireless network.

Figure 6:
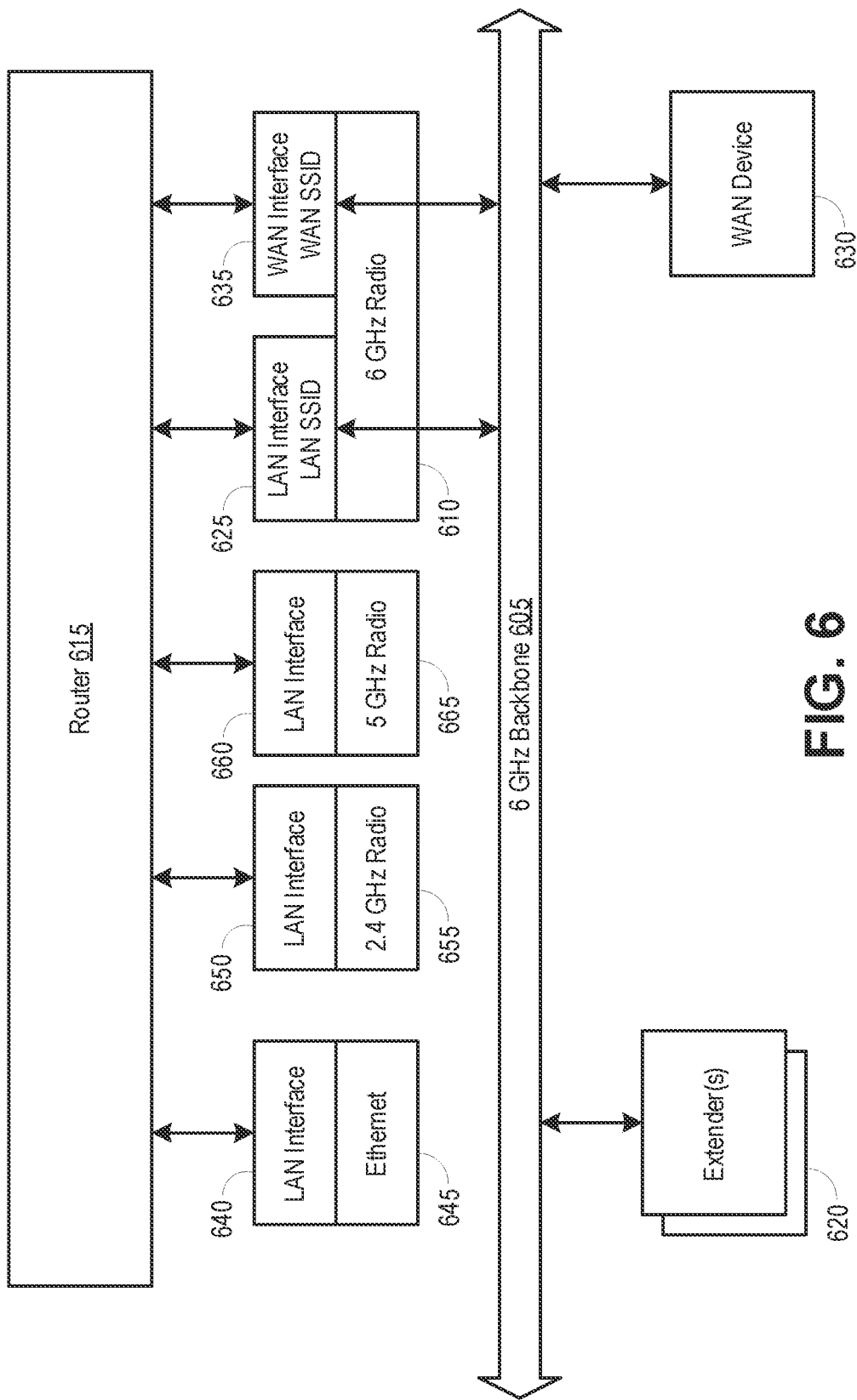
FIG. 6 is a block diagram showing an example system for transmitting and receiving signals over a 6 GHz backbone.

FIG. 6 is a block diagram showing an example system for transmitting and receiving signals over a 6 GHz backbone 605. In embodiments, two logical interfaces may be provided over a single 6 GHz radio 610 (e.g., LAN SSID and WAN SSID). Traffic between the WAN and LAN SSIDs may go through a router 615 for typical WAN ingress functions (e.g., firewall). In embodiments, a VLAN tag may be used to distinguish and separate WAN and LAN traffic. One or more extenders 620 may associate to the LAN SSID and may acquire an IP address from a gateway (e.g., the router 615 may be integrated within a gateway device). For example, the one or more extenders 620 may communicate through the LAN interface 625. The extender(s) 620 may be a Wi-Fi client. The WAN device 630 may discover and associate with a gateway. The WAN device 630 may be a Wi-Fi client. Upon association, a link-up event occurs on the gateway. The gateway acquires an IP address from the WAN network. The WAN device 630 has a fixed, well-known IP address for management.

In embodiments, each respective channel block of one or more channels within the 6 GHz band may be allocated to a certain room or space within a premise. For example, a room configured with virtual reality headsets may have its in-room extender (e.g., an extender 620) configured with a 160 MHz channel block while another room with only cell phones and laptop users may only have an 80 MHz channel block configured. Power levels may be optimized for each channel based upon one or more factors associated with the location and/or barriers between each room or space and a 6 GHz AP or extender. A separate channel block allocation may be used for communication between the in-room extenders and an AP (e.g., gateway).

In embodiments, signals may be received at and transmitted from a subscriber premise through a network interface device (NID). A 6 GHz backbone may be used to pass signals between the NID and an AP that is positioned within the premise (e.g., the AP may be centrally located within the premise). The 6 GHz backbone may be provided by the NID itself, or by a separate device that is either attached to the NID, wall-mounted near the NID, or otherwise positioned near in proximity to the NID. For example, home network wiring may be eliminated by adding a 6 GHz radio to the NID and using one or more 6 GHz network extenders to provide Wi-Fi coverage throughout the home.

A network may be configured to use a standard power backbone line offering higher throughput in a certain size channel versus the throughput available for a low power backbone. For example, a NID to AP backbone that may also allow extenders to join may use a 320 MHz channel block at standard power to pass information between the NID and the APs and extenders. Within each room, the extenders may use low power transmissions over 160 or 320 MHz channel blocks. Even though these channels may be as large or larger than the backbone link, the lower power will result in lower throughput within the rooms. This is still advantageous because it allows the in-room extenders to be less likely to interfere with each other while still providing plenty of bandwidth for the devices in the room to provide wireless services.

Each in-room extender also has the option of using 2.4 or 5 GHz transmission bands as well as the 6 GHz transmission band. If an extender has client devices that require the lower bands, the extender may have additional Wi-Fi radios, such as 2.4 or 5 GHz radios, to support those legacy devices. The traffic to and from the in-room extender would still be carried over the 6 GHz backbone. In embodiments, the one or more extenders 620 may communicate through a LAN interface 640 via an Ethernet port 645, a LAN interface 650 via a 2.4 GHz radio 655, and/or a LAN interface 660 via a 5 GHz radio 665.

In embodiments, the one or more network extenders 620 may be configured to communicate with the WAN device 630 via the 6 GHz backbone 605. For example, communications may be received from and forwarded to one or more extenders 620 via the LAN interface 625, and communications may be received from and forwarded to the WAN device 630 via the WAN interface 635.

Figure 7:
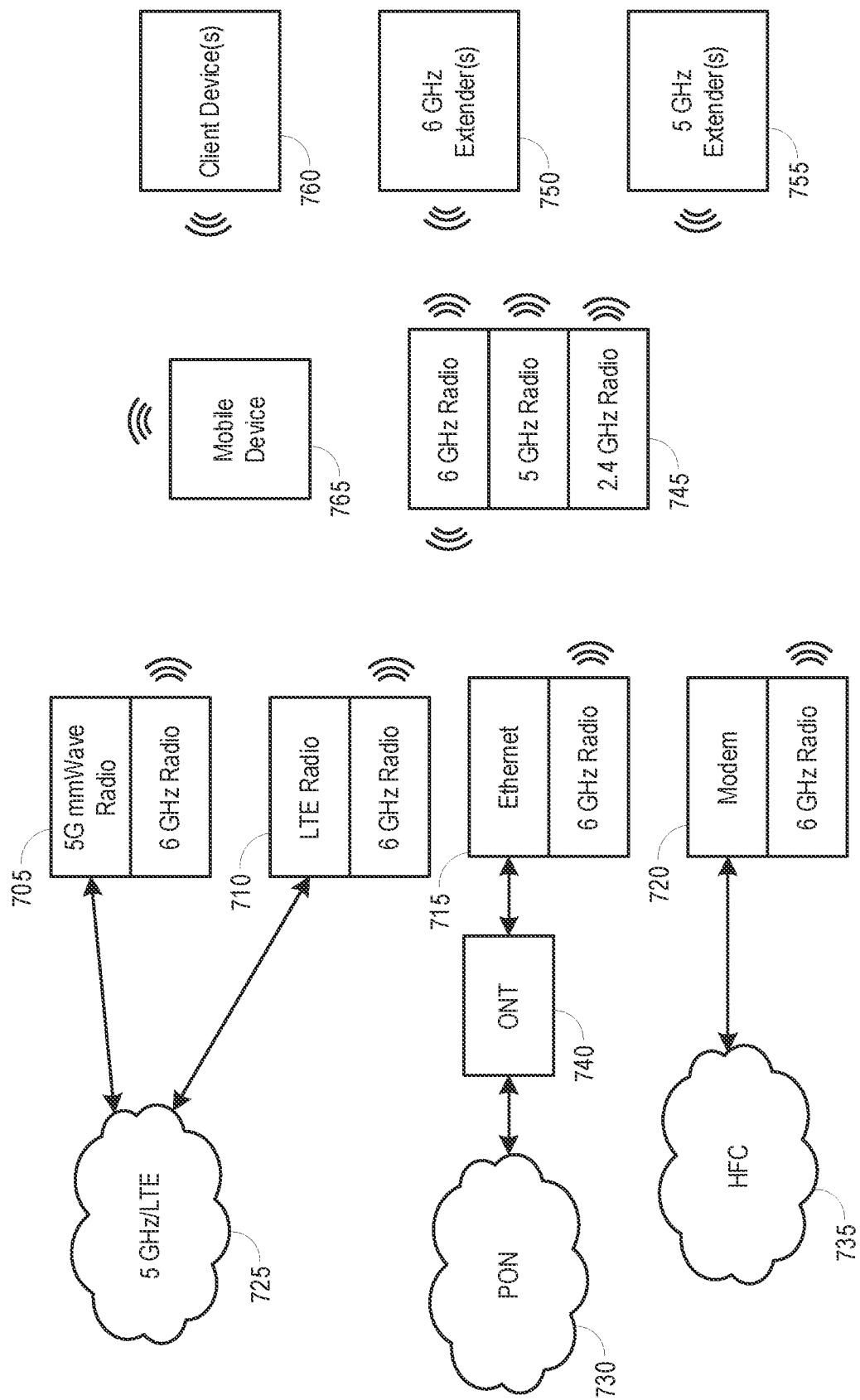
FIG. 7 is a block diagram showing an example network architecture facilitating use of a 6 GHz wireless band.

FIG. 7 is a block diagram showing an example network architecture facilitating use of a 6 GHz wireless band. In embodiments, an adapter may be located in a premise, wherein the adapter converts WAN communications to Wi-Fi signals, which are then communicated to one or more devices over a 6 GHz wireless band. In embodiments, one or more WAN adapters (e.g., 5G mmWave to 6 GHz adapter 705, LTE to 6 GHz adapter 710, PON to 6 GHz adapter 715, and/or HFC to 6 GHz adapter 720) may facilitate signal translations to support communications between a 6 GHz WAN and one or more various communication networks (e.g., 5 GHz/LTE 725, PON 730, HFC 735). A PON to 6 GHz adapter 715 may be connected to an ONT 740. Each WAN adapter may include a 6 GHz radio to transmit and receive 6 GHz wireless signals to and from a gateway device (e.g., tri-band gateway 745). A tri-band gateway 745 may include a 2.4 GHz radio, a 5 GHz radio, and/or a 6 GHz radio, and the gateway may facilitate communications between the 6 GHz WAN and one or more WLANs (e.g., 5 GHz WLAN and/or 6 GHz WLAN). The gateway may communicate with one or more extenders (e.g., 6 GHz extender(s) 750 and/or 5 GHz extender(s) 755), client devices 760, and/or mobile device(s) 765 over the one or more WLANs.

Figure 8:
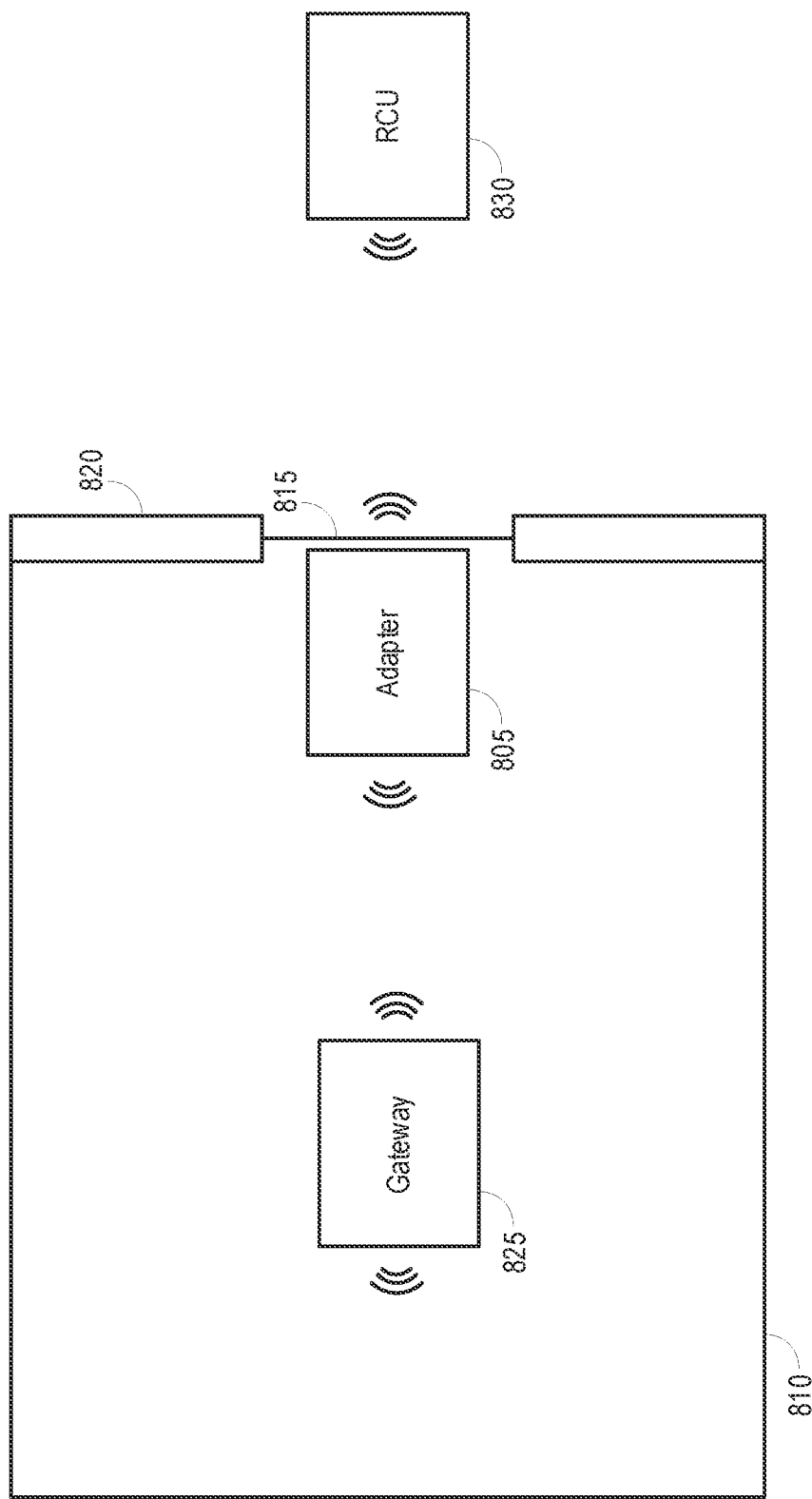
FIG. 8 shows an example utilization of mmWave to 6 GHz bridging.

FIG. 8 shows an example utilization of mmWave to 6 GHz bridging. In embodiments, an adapter 805 may be installed at a premise 810 (e.g., the adapter 805 may be installed at a window 815 of an exterior wall 820 of the premise 810), and the adapter 805 may operate as a mmWave to 6 GHz convertor. The adapter 805 may include a 5G UE to 6 GHz Wi-Fi solution, thereby providing a 6 GHz WLAN within the premise 810. A 4×4 6 GHz solution may be used to connect to a gateway 825. The adapter 805 may provide a 6 GHz backhaul, and the gateway 825 may have tri-band capability, thereby facilitating communications between the gateway 825 and the adapter 805.

In embodiments, the adapter 805 may include a removable interface module (e.g., removable interface module 1130 of FIG. 11), the removable interface module facilitating a conversion of mmWave communications to 6 GHz communications and vice versa. The removable interface module may be installed at either the gateway device 825 or the adapter 805, and the removable interface module may be moved between the gateway device 825 and the adapter 805 based upon the quality of connection to an RCU 830 providing mmWave communications.

In embodiments, a user or installer may verify the performance of a 6 GHz backhaul when the removable interface module is installed at the gateway 825 and/or when the removable interface module is installed at the adapter 805. Based on the performance metrics, the user or installer may install the removable interface module at the device or location having the better or more desirable performance metrics.

In embodiments, the gateway 825 may be configured with multiple operating modes, wherein the gateway 825 operates in a first mode when an installation of the removable interface module at the gateway 825 is detected and a second mode when an installation of the removable interface module at the gateway 825 is not detected. For example, when operating in the first mode, the gateway 825 may disable a 6 GHz module that is used by the gateway 825 to communicate over a 6 GHz backhaul provided by the adapter 805. When operating in the second mode, the gateway 825 may enable the 6 GHz module that is used to communicate over the 6 GHz backhaul provided by the adapter 805.

Figure 9:
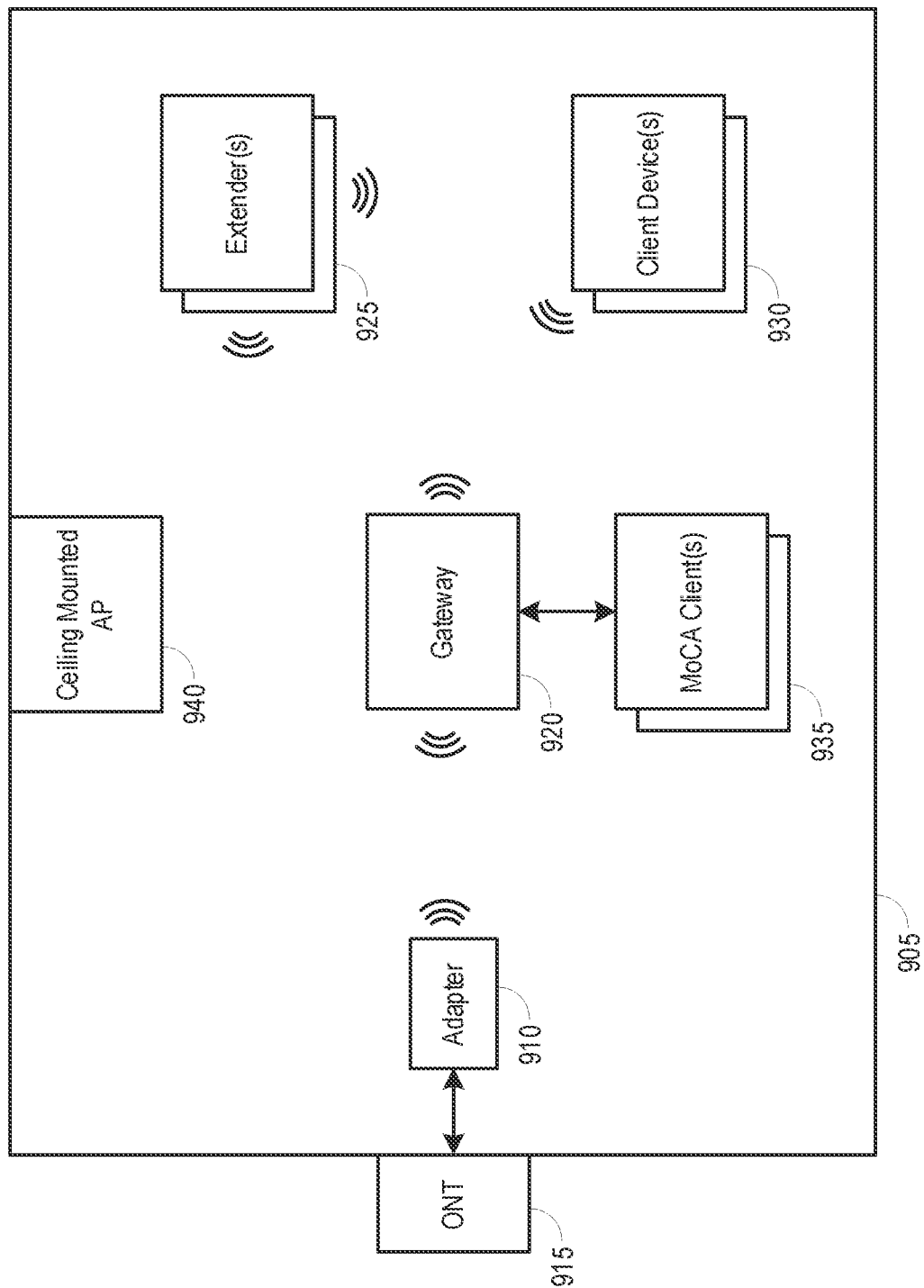
FIG. 9 is a block diagram showing an example home network in which broadband is brought into a premise using 6 GHz and a 6 GHz adapter.

FIG. 9 is a block diagram showing an example home network in which broadband is brought into a premise 905 using 6 GHz and a 6 GHz adapter 910. In embodiments, the adapter 910 may be connected to an ONT 915 via a wired connection (e.g., 2.5 GigE). The adapter 910 may include a 6 GHz radio through which a 6 GHz wireless backhaul may be provided. The adapter 910 may be installed within the premise 905 in close proximity to the ONT 915. A gateway 920 having a 6 GHz radio may utilize the 6 GHz wireless backhaul that is provided by the adapter 910. With a wireless backhaul, the gateway 920 may be placed in an optimal location within the premise 905 to provide a wider coverage area within the premise 905. For example, the gateway 920 may be placed at a central location within the premise.

In embodiments, the gateway may provide a WLAN that may be accessed by one or more extenders 925 and/or one or more client devices 930. The gateway 920 may provide one or more services to one or more MoCA clients 935 via a wired connection to the MoCA clients 935.

In embodiments, a ceiling mounted AP 940 may be installed at a ceiling of the premise 905. The ceiling mounted AP 940 may be installed at a location that has access to power but that has no access to a data interface. The ceiling mounted AP 940 may communicate over the 6 GHz backhaul provided by the adapter 910 and may provide wireless services to one or more client devices 930. The ceiling mounted AP 940 may wirelessly communicate with the gateway 920.

Figure 10:
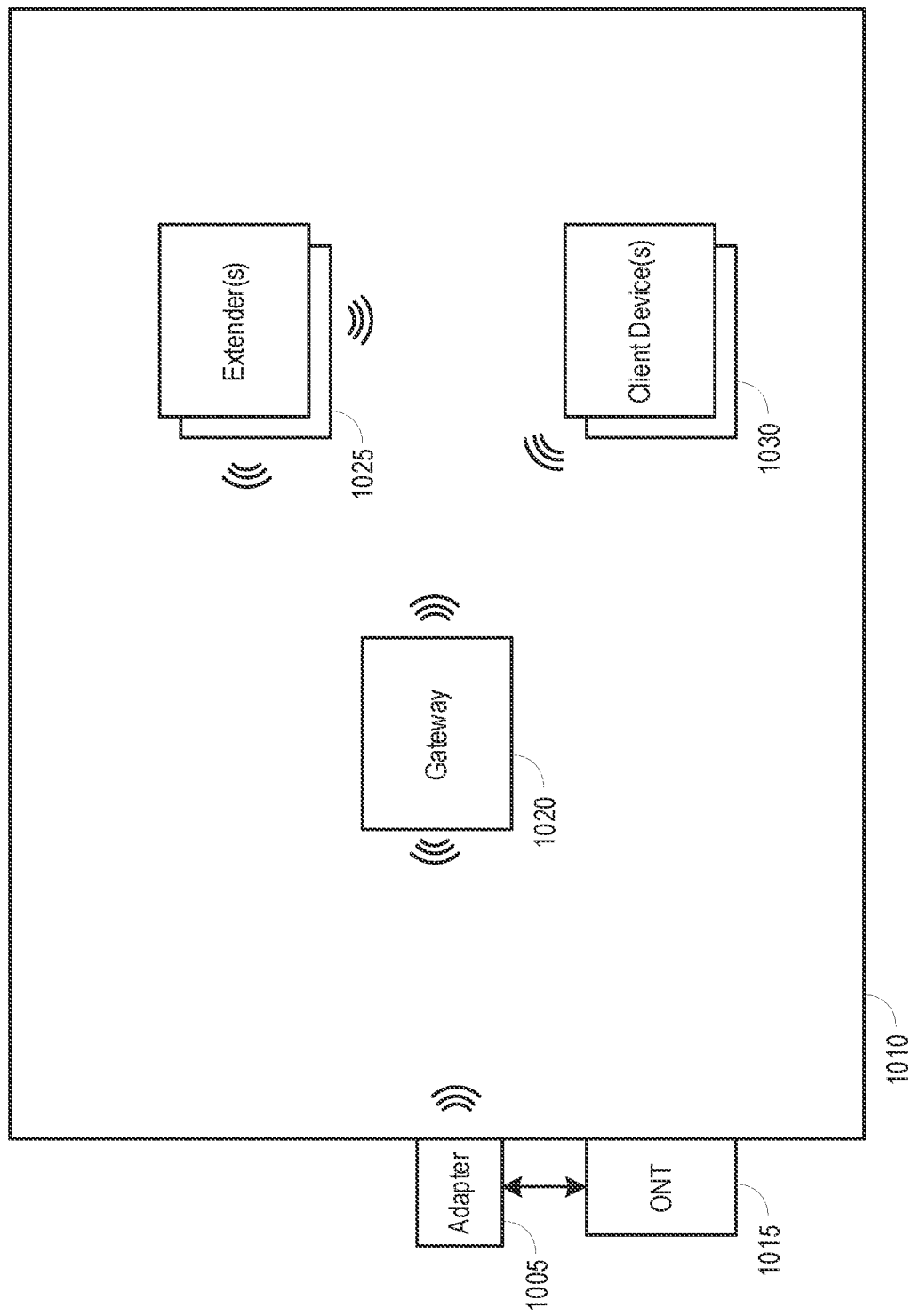
FIG. 10 is a block diagram showing an example home network that is supported by a 6 GHz backbone.

FIG. 10 is a block diagram showing an example home network that is supported by a 6 GHz backbone. In embodiments, a 6 GHz wireless backhaul may be provided by an adapter 1005 that is located outside of a premise 1010 and that is connected to an ONT 1015 via a wired connection. The 6 GHz wireless backhaul may be utilized by a gateway 1020 located within the premise 1010, and the gateway 1020 may provide wireless services to one or more extenders 1025 and/or one or more client devices 1030 via one or more wireless interfaces/radios.

Figure 11:
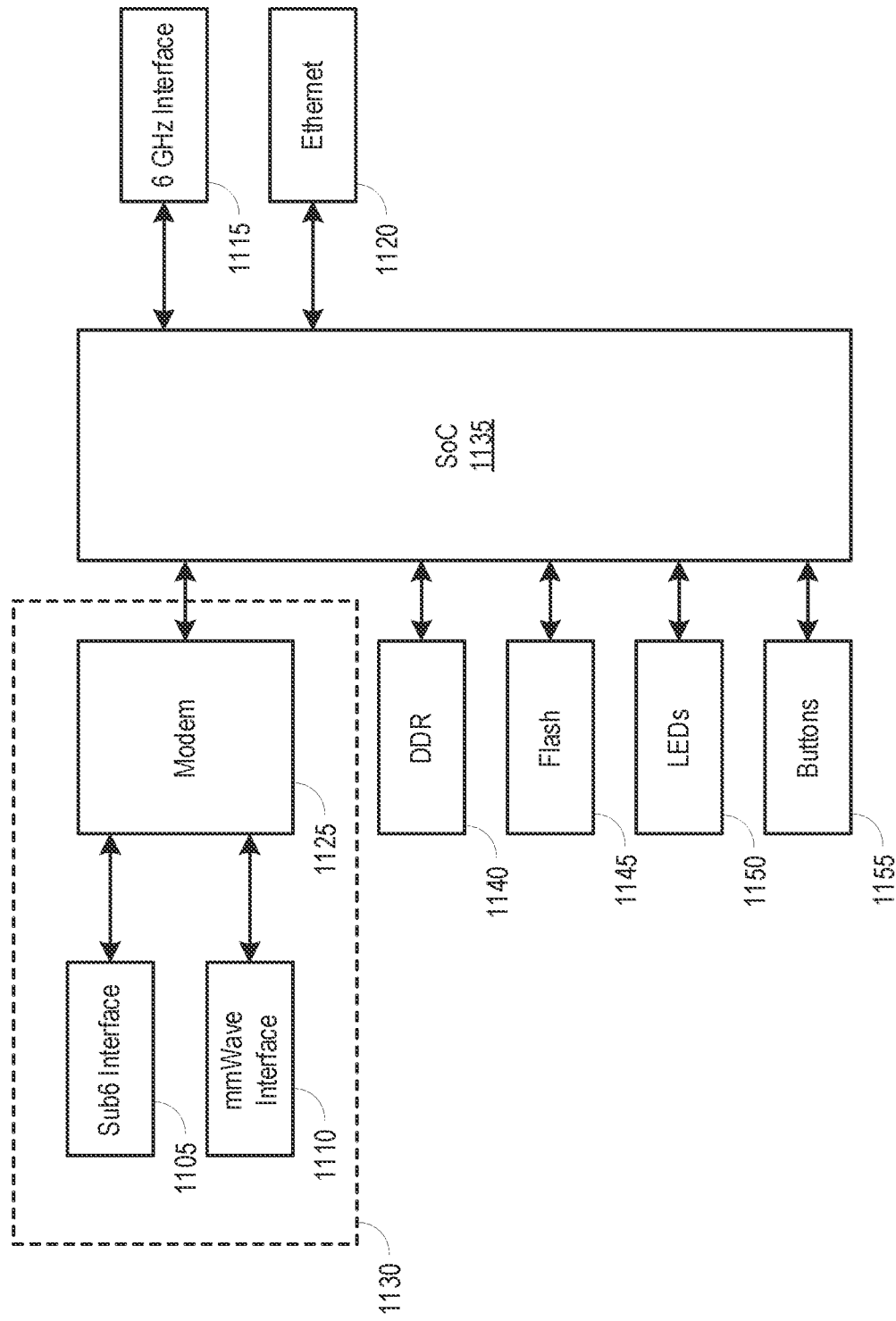
FIG. 11 shows an example schematic of a mmWave to 6 GHz adapter.

FIG. 11 shows an example schematic of a mmWave to 6 GHz adapter. In embodiments, the adapter may convert signals received through the sub6 interface 1105 and/or mmWave interface 1110 to signals that are communicated through the 6 GHz interface 1115 and/or Ethernet interface 1120. The adapter may provide 6 GHz wireless services and/or Ethernet communications to a subscriber premise. In embodiments, the sub6 and/or mmWave RF interfaces and the modem 1125 may be installed at the adapter as a removable interface module 1130, and the removable interface module 1130 may be moved from the adapter to a gateway that is located at a different location of the subscriber premise.

The adapter may include a SoC (system-on-chip) 1135, DDR 1140, flash 1145, LEDs 1150, and/or buttons 1155.

In embodiments, the 6 GHz interface module may include a plurality of antennas and may support multiple input-multiple output (MIMO) services (e.g., 2×2, 4×4, etc.).

6 GHz Structured Wi-Fi in the Home or SMB

Wi-Fi services have been deployed in the home, and small to medium businesses (SMB), largely on an ad hoc basis. Even as more sophisticated mesh schemes have been used to extend coverage, the channels and bands used have been restricted to the 2.4 GHz and 5 GHz bands which are relatively congested. The power levels in those bands are such that even in detached single family residences (SFR) there is enough leakage from one home to another that few residences do not have impinging signals from other nearby residences. In the case of multiple dwelling units (MDU) and SMB units, the situation is even worse with most businesses have multiple overlapping signals from other Wi-Fi APs and their clients.

The 6 GHz band may offer improved conditions with an approach referred to herein as structured Wi-Fi. The 6 GHz band may offer several hundred GHz of open channels, with the potential restriction that the power levels allowed may be quite low (250 mW to 100 mW). Structured APs may offer 6 GHz as well as 2.4 and 5 GHz services. The APs may provide more complex switching and routing for packets than are currently common.

Figure 12:
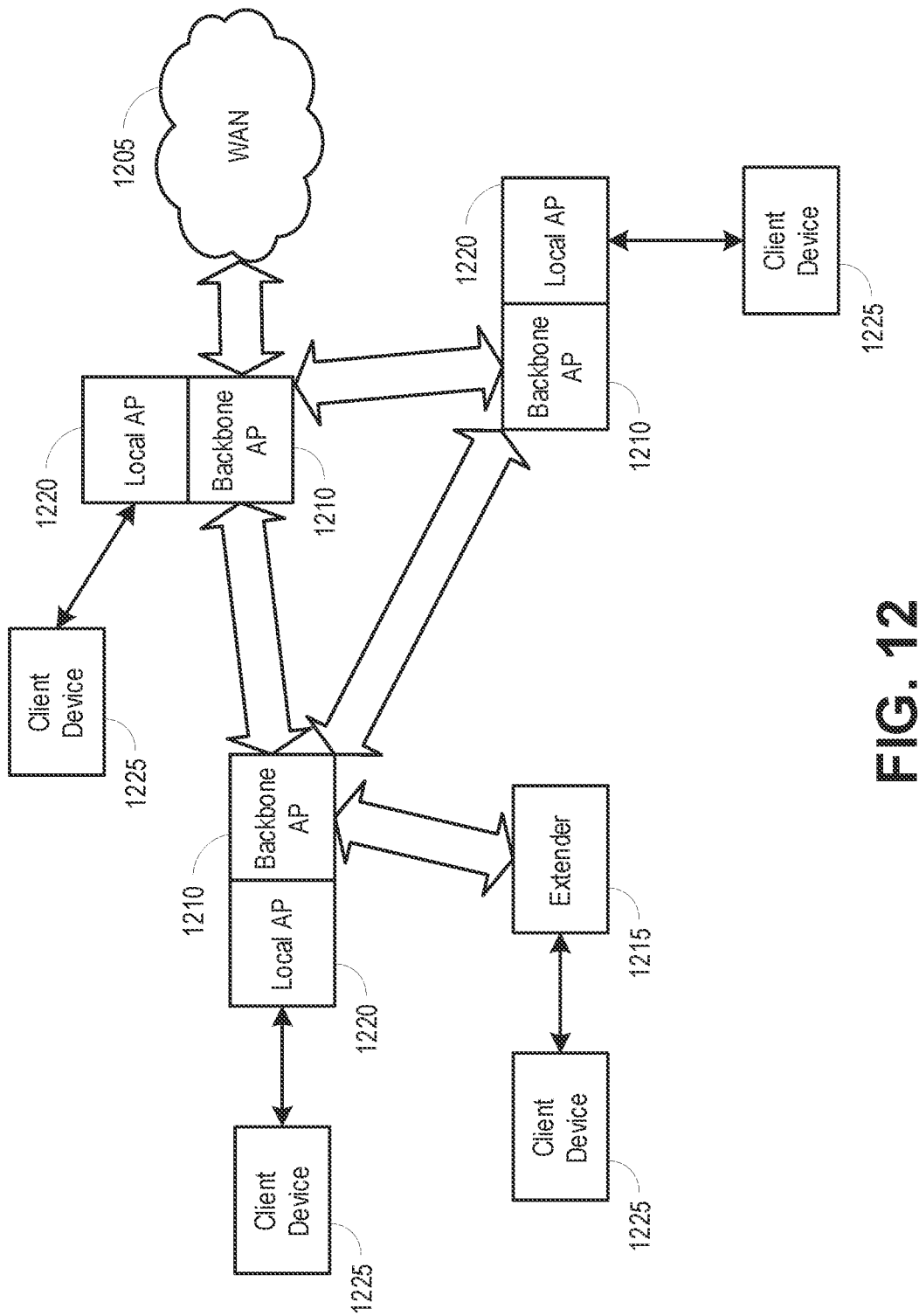
FIG. 12 shows wider connections for higher bandwidth connections and narrower connection for lower bandwidth connections.

A backbone AP may connect using a wide 6 GHz channel to at least one other backbone AP. The backbone APs may operate as a mesh to minimize the number of wireless hops that a packet must traverse to reach a WAN connection. Subtending from the backbone APs' mesh are local APs and their clients. FIG. 12 is a block diagram showing an example network comprising a plurality of backbone APs.

FIG. 12 shows wider connections for higher bandwidth connections and narrower connection for lower bandwidth connections. For example, the connections between the WAN 1205 and the backbone APs 1210, the connections between the backbone APs 1210, and the connections between the backbone APs 1210 and the extenders 1215 may be higher bandwidth connections than the connections between the local APs 1220 and/or extenders 1215 and the client devices 1225.

The system uses wider channels, for example 400 MHz channels, for back bone connections, and narrower channels, such as 160 MHz channels, for connections to clients 1225.

A client may associate with a local AP or with an extender AP, but the backbone connections are separate channels from the client connections. A channel used for client connections could be at a lower power as well as using a more narrow channel bandwidth. Lower power signals have more difficulty penetrating walls, so the client connections to local APs can still provide high speed connections within a room, while not contributing to congestion or causing interferences with other non-Wi-Fi communications.

In embodiments, an AP may detect the usage of one or more 6 GHz channels by one or more neighboring APs. For example, in an MDU, an AP may be configured to exchange information with neighboring APs, wherein the information identifies the channel(s) being used by the APs and/or use metrics associated with the APs use of the identified channel(s). Based upon the exchanged information, the AP may determine an optimal 6 GHz channel to use. For example, the AP may select a 6 GHz channel that is identified as having the lowest usage level by neighboring APs.

In embodiments, an AP may change 6 GHz channels until a channel is found that is not being used by a neighboring AP.

In embodiments, the information exchanged between neighboring APs may trigger a reallocation of the channels used by each AP. For example, each of the neighboring APs may be assigned to a unique channel.

Physical Instantiations

The combination backbone AP/Local AP (e.g., the integrated backbone AP 1210 and local AP 1220 shown in FIG. 12) may be in a standard black rectangular box, but there are advantages to placing these APs at ceiling level. For example, a combined backbone AP and local AP may be integrated in a ceiling mounted AP 940 of FIG. 9). There are fewer obstacles high in the room and fewer moving obstacles that can cause a signal level to change often. One possible instantiation is in a ceiling fan. These fans typically have substantial heft compared to a simple light fixture making it easier to add the AP circuitry. Fans are also typically located in the center of a room making the coverage within the room easier. A ceiling AP may have one 6 GHz backbone radio that may support a wider channel and/or a higher power level than a second radio in the ceiling AP. The second radio may be another 6 GHz radio operating at a different lower power level and a different channel than the backbone AP. The second radio may be a standard single or dual band 2.4 or 5 GHz Wi-Fi radio. The second radio may be a 6 GHz Wi-Fi radio or a LiFi radio. Either of the last two options are also good for keeping signals within a room and minimizing interference with adjacent rooms.

In embodiments, the ceiling mounted AP may be installed at a location that is powered but that does not have a wired data connection. For example, the ceiling mounted AP may be installed at a ceiling fan or other ceiling mounted fixture having access to power. The ceiling mounted AP may connect to a wireless backhaul (e.g., a 6 GHz wireless backhaul) to provide wireless services to one or more client devices via one or more interfaces (e.g., 2.4 GHz, 5 GHz, 6 GHz interface, etc.).

Timing Distribution/Low Latency Services/QoS

PTP (IEEE-1588) allows distribution of timing over Ethernet. DTP from CableLabs extended this technology over DOCSIS.

Motivation for 6 GHz Wi-Fi application: new unlicensed frequency band likely to have little interference for a while, especially if all four bands are opened. If only band 6 is open, that advantage will be short-lived.

This disclosure applies to a cable modem GW that also has Wi-Fi including 6 GHz (but not required). The CM supports DTP as does its supporting CMTS. The CMTS/CM could provide several different timing sources. As different mobile providers advance their networks from 4G to 5G at different rates, there may be different timing feeds available for different small cell/pico cell uses. The timing feeds may also be of different qualities (4G vs 5G 1 ms).

The AP can advertise its support for timing distribution or provide it later in a capabilities exchange. This notification could come via a field in the beacon or in a capabilities exchange after the STAs are associated. The notification could include multiple possible timing sources that the CM/AP may have available. The notification could also indicate the accuracy or quality of each potential timing source. A STA decides whether an AP can provide a timing feed that it needs. The STA can request the timing feed. If a STA wants to receive a timing distribution, it notifies the AP that that it wants to receive a timing distribution. That notification could indicate which timing source the STA is interested in and/or potentially a level of accuracy or quality that it needs to receive. The AP may evaluate whether it can provide the service that the STA has requested. The AP may need to communicate with the CM and/or the CMTS to ensure that the requested service and QoS level can be provided. The AP/CM passes that request back to the CMTS. If the CM/AP has to support multiple timing feeds then the CM may select which one to use for its internal systems, or it may not use any specific feed directly. If the AP can provide the STA with the service it requested, then it selects an OFDM/OFDMA downstream and upstream channel to carry the timing messages. For example, the timing messages may be carried over a selected 6 GHz channel. Note that the channel may actually be one or more resource units (RU) as known in 11ax with limited bandwidth, but that can be dedicated to this purpose. The AP and STA begin communicating over that RU according to a schedule developed by the AP to accommodate the QoS requirements of the service level that the STA had requested. The AP may choose a limited set of MCS settings for the channel to ensure predictability and good performance.

Figure 13:
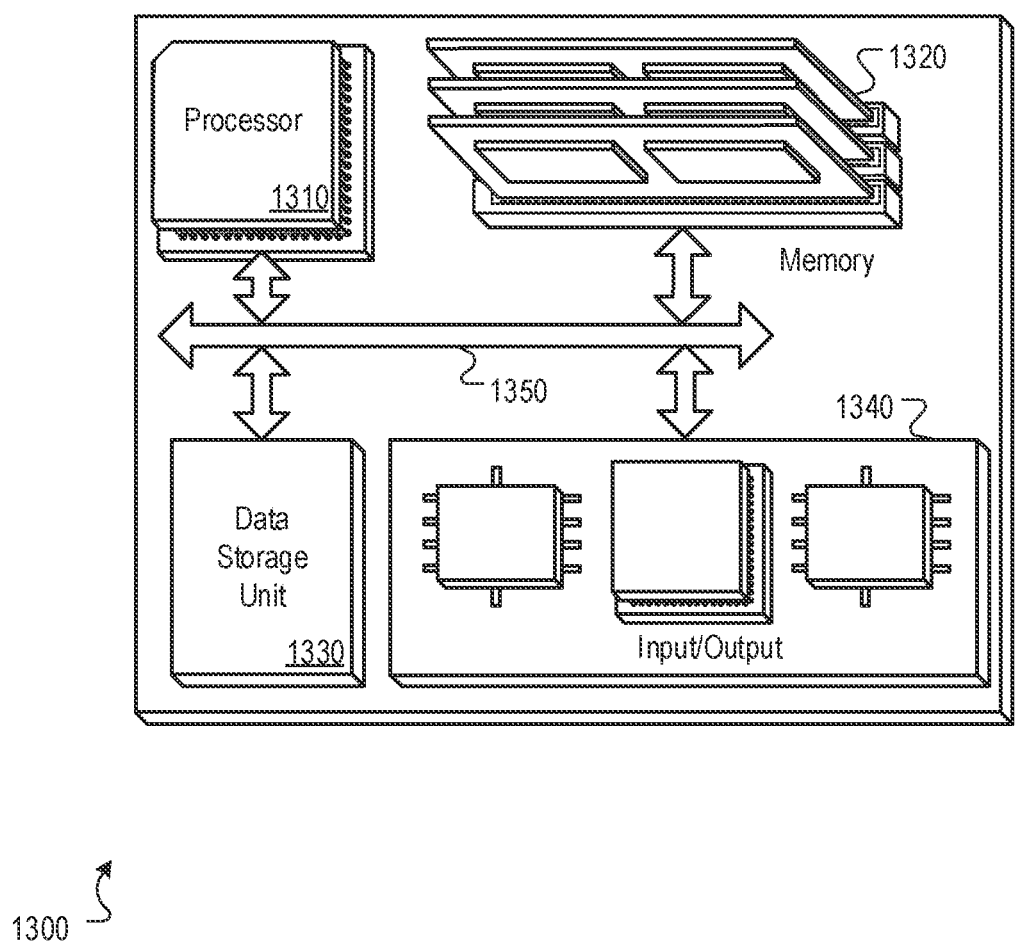
FIG. 13 is a block diagram of a hardware configuration operable to facilitate and utilize a 6 GHz backbone and/or 6 GHz wireless communications.

FIG. 13 is a block diagram of a hardware configuration 1300 operable to facilitate and utilize a 6 GHz backbone and/or 6 GHz wireless communications. The hardware configuration 1300 can include a processor 1310, a memory 1320, a storage device 1330, and an input/output device 1340. Each of the components 1310, 1320, 1330, and 1340 can, for example, be interconnected using a system bus 1350. The processor 1310 can be capable of processing instructions for execution within the hardware configuration 1300. In one implementation, the processor 1310 can be a single-threaded processor. In another implementation, the processor 1310 can be a multi-threaded processor. The processor 1310 can be capable of processing instructions stored in the memory 1320 or on the storage device 1330.

The memory 1320 can store information within the hardware configuration 1300. In one implementation, the memory 1320 can be a computer-readable medium. In one implementation, the memory 1320 can be a volatile memory unit. In another implementation, the memory 1320 can be a non-volatile memory unit.

In some implementations, the storage device 1330 can be capable of providing mass storage for the hardware configuration 1300. In one implementation, the storage device 1330 can be a computer-readable medium. In various different implementations, the storage device 1330 can, for example, include a hard disk device, an optical disk device, flash memory or some other large capacity storage device. In other implementations, the storage device 1330 can be a device external to the hardware configuration 1300.

The input/output device 1340 provides input/output operations for the hardware configuration 1300. In one implementation, the input/output device 1340 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device (e.g., television, STB, computer, mobile device, tablet, etc.) or display device associated with a client device. In another implementation, the input/output device can include driver devices configured to send communications to, and receive communications from one or more networks.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method of a station for identifying a 6 Gigahertz (GHz) channel, comprising:
   receiving a 6 GHz advertisement from an access point;
   identifying the 6 GHz channel based on the 6 GHz advertisement;
   determining one or more operational requirements associated with the 6 GHz channel; and
   activating a 6 GHz radio of the station based on the one or more operational requirements.

2. The method of claim 1, wherein the one or more operational requirements indicate a power level of the 6 GHz channel.

3. The method of claim 1, further comprising:
   scanning for the 6 GHz channel by a 5 GHz radio of the station.

4. The method of claim 1, further comprising:
   receiving a notification from the access point to drop from standard power to low power for the 6 GHz channel.

5. The method of claim 1, further comprising:
   receiving a notification from the access point to evacuate the 6 GHz channel.

6. The method of claim 1, further comprising:
   shifting to a non-6 GHz band until a new assignment is obtained by the access point.

7. The method of claim 1, wherein the receiving the 6 GHz advertisement is via a capabilities exchange after the station and the access point are associated.

8. A station for identifying a 6 Gigahertz (GHz) channel, the station comprising:
   a memory storing one or more computer-readable instructions; and
   a processor configured to execute the one or more computer-readable instructions to:
      receive a 6 GHz advertisement from an access point;
      identify the 6 GHz channel based on the 6 GHz advertisement;
      determine one or more operational requirements associated with the 6 GHz channel; and
      activate a 6 GHz radio of the station based on the one or more operational requirements.

9. The station of claim 8, wherein the one or more operational requirements indicate a power level of the 6 GHz channel.

10. The station of claim 8, further comprising:
    scanning for the 6 GHz channel by a 5 GHz radio of the station.

11. The station of claim 8, wherein the process is further configured to execute the one or more computer-readable instructions to:
    receive a notification from the access point to drop from standard power to low power for the 6 GHz channel.

12. The station of claim 8, wherein the process is further configured to execute the one or more computer-readable instructions to:
    receive a notification from the access point to evacuate the 6 GHz channel.

13. The station of claim 8, wherein the process is further configured to execute the one or more computer-readable instructions to:
    shift to a non-6 GHz band until a new assignment is obtained by the access point.

14. The station of claim 8, wherein the receiving the 6 GHz advertisement is via a capabilities exchange after the station and the access point are associated.

15. One or more non-transitory computer readable media having one or more instructions stored thereon operable to cause one or more processors to perform one or more operations comprising:
    receiving a 6 GHz advertisement from an access point;
    identifying the 6 GHz channel based on the 6 GHz advertisement;
    determining one or more operational requirements associated with the 6 GHz channel; and
    activating a 6 GHz radio of the station based on the one or more operational requirements.

16. The one or more non-transitory computer readable media of claim 15, wherein at least one of:
    the one or more operational requirements indicate a power level of the 6 GHz channel; and
    the receiving the 6 GHz advertisement is via a capabilities exchange after the station and the access point are associated.

17. The one or more non-transitory computer readable media of claim 15, wherein the one or more instructions are further operable to cause the one or more processors to further perform the one or more operations comprising:

scanning for the 6 GHz channel by a 5 GHz radio of the station.

18. The one or more non-transitory computer readable media of claim 15, wherein the one or more instructions are further operable to cause the one or more processors to further perform the one or more operations comprising:

receiving a notification from the access point to drop from standard power to low power for the 6 GHz channel.

19. The one or more non-transitory computer readable media of claim 15, wherein the one or more instructions are further operable to cause the one or more processors to further perform the one or more operations comprising:

receiving a notification from the access point to evacuate the 6 GHz channel.

20. The one or more non-transitory computer readable media of claim 15, wherein the one or more instructions are further operable to cause the one or more processors to further perform the one or more operations comprising:

shifting to a non-6 GHz band until a new assignment is obtained by the access point.

* * * * *